United States Patent
Lee et al.

(10) Patent No.: US 8,866,932 B2
(45) Date of Patent: Oct. 21, 2014

(54) VOICE RECORDABLE TERMINAL AND ITS IMAGE PROCESSING METHOD

(75) Inventors: Soo Hyun Lee, Seoul (KR); Hee Chul Yun, Suwon-si (KR); Hak Su Oh, Suwon-si (KR); Ho Ik Hwang, Hwaseong-si (KR); Myoung Joon Kim, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 649 days.

(21) Appl. No.: 12/632,016

(22) Filed: Dec. 7, 2009

(65) Prior Publication Data

US 2010/0157097 A1    Jun. 24, 2010

(30) Foreign Application Priority Data

Dec. 8, 2008  (KR) ................. 10-2008-0123971

(51) Int. Cl.
| | | |
|---|---|---|
| H04N 5/76 | (2006.01) | |
| G11B 27/34 | (2006.01) | |
| G11B 27/034 | (2006.01) | |
| H04N 5/77 | (2006.01) | |
| G11B 27/10 | (2006.01) | |
| H04N 9/804 | (2006.01) | |
| H04N 9/806 | (2006.01) | |
| H04N 9/82 | (2006.01) | |

(52) U.S. Cl.
CPC .............. *H04N 5/772* (2013.01); *H04N 9/8042* (2013.01); *G11B 27/34* (2013.01); *H04N 9/8063* (2013.01); *G11B 27/034* (2013.01); *H04N 9/8205* (2013.01); *G11B 27/105* (2013.01)
USPC .................. 348/231.4; 348/231.2; 348/231.3; 348/231.5; 348/231.6

(58) Field of Classification Search
CPC ....................... H04N 5/772; H04N 2201/3264
USPC .......... 348/231.99, 231.2–231.6; 386/95, 117
See application file for complete search history.

(56) References Cited

U.S. PATENT DOCUMENTS

| | | | | |
|---|---|---|---|---|
| 5,784,525 | A * | 7/1998 | Bell | 386/228 |
| 6,774,939 | B1 * | 8/2004 | Peng | 348/231.4 |
| 7,180,540 | B2 * | 2/2007 | Son | 348/231.4 |
| 2004/0076230 | A1 * | 4/2004 | Tomono | 375/240.01 |
| 2004/0167783 | A1 * | 8/2004 | Nagai | 704/270 |
| 2005/0154988 | A1 * | 7/2005 | Proehl et al. | 715/720 |
| 2006/0045487 | A1 * | 3/2006 | Iida et al. | 386/95 |
| 2008/0276279 | A1 * | 11/2008 | Gossweiler et al. | 725/46 |
| 2009/0317064 | A1 * | 12/2009 | Matsubayashi | 386/124 |

* cited by examiner

*Primary Examiner* — Twyler Haskins
*Assistant Examiner* — Quang Le
(74) *Attorney, Agent, or Firm* — Cha & Reiter, LLC

(57) ABSTRACT

A voice recordable terminal and its image processing method are provided. The image processing method includes determining whether or not capturing is selected when a recording function of storing voice data is performed, acquiring at least one meta image when the capturing is selected, and storing at least one voice file including the acquired meta image and the voice data.

15 Claims, 12 Drawing Sheets

FIG. 5
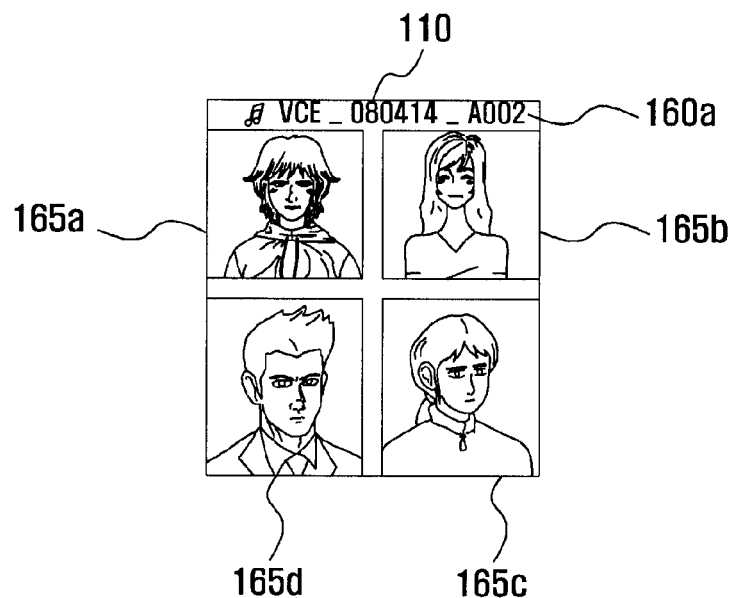
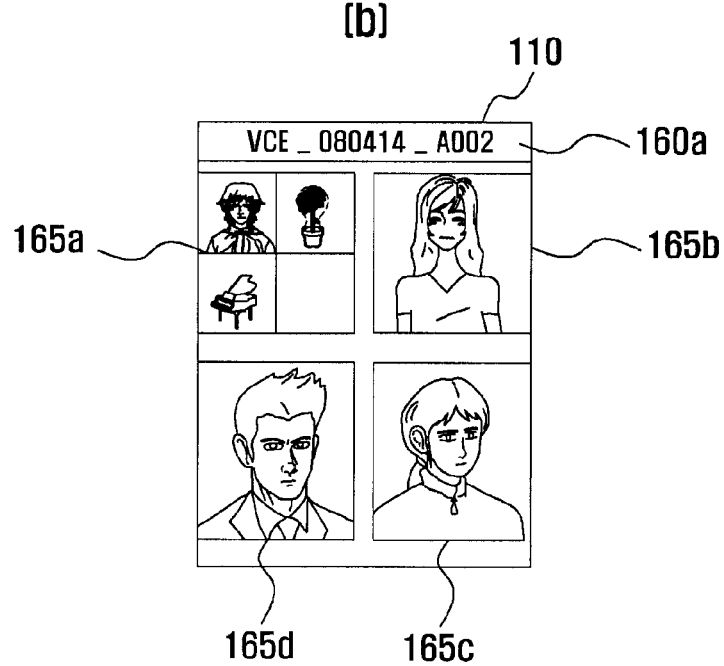

VOICE RECORDABLE TERMINAL AND ITS IMAGE PROCESSING METHOD

CLAIM OF PRIORITY

This application claims priority to and the benefit of Korean Patent Application No. 10-2008-0123971 filed in the Korean Intellectual Property Office on Dec. 8, 2008, the entire contents of which are incorporated herein by reference.

BACKGROUND OF THE INVENTION

1. Field of the Invention

The present invention relates to a voice recordable terminal and its image processing method, and more particularly, to an image processing method and terminal capable of generating an image during voice recording and verifying a recorded file using the generated image 2. Description of the Related Art With the development of modern technologies, it is possible to generate and store various data using an electronic device, such as a camcorder, a digital camera, a voice recorder, a mobile phone, a Moving Picture Experts Group-1 (MPEG-1) Audio Layer-3 (MP3) player, and so on.

Among them, the voice recorder enables a user to store desired data without the aid of hand-writing or typing. The voice recorder is not restricted by place or time, and enables a user to store voice data without using any writing tools.

The voice data stored in the voice recorder is typically stored using words. Thus, a user checks the stored voice data one by one during a replay or inferring the content of the voice data using the word-based name. Further, when the voice data is created in the conventional voice recording devices, additional information other than the name, for instance the name combined with the created order and date, cannot be stored.

SUMMARY OF THE INVENTION

The present invention has been made in view of the above problems and provides additional advantages, by providing a voice recordable terminal and its image processing method.

In accordance with an aspect of the present invention, an image processing method includes: determining whether or not capturing is selected when a recording function of storing voice data is performed; acquiring at least one meta image when the capturing is selected; and storing at least one voice file including the acquired meta image and the voice data.

In accordance with another aspect of the present invention, a voice recordable terminal includes: an audio processing unit into which voice data is input; a camera acquiring a meta image when the voice data is input; a storage unit storing at least one voice file including the voice data and the meta image; and a control unit acquiring the meta image through the cameral when capturing is selected during performing a recording function of storing the voice data input through the audio processing unit, and adding the meta image and the voice data to the voice file to store the added result when the recording function is stopped.

According to exemplary embodiments of the present invention, a user can efficiently get access to the voice data to be reproduced through the terminal. Even when the recorded voice data is transferred to another terminal, the user can easily check the information on the recorded voice data. Further, a different meta image is provided to each voice data, so that the user can easily search for the voice data.

BRIEF DESCRIPTION OF THE DRAWINGS

The above features and advantages of the present invention will be more apparent from the following detailed description in conjunction with the accompanying drawings, in which:

FIGS. 4 and 5 illustrate a screen displaying a meta image included in a voice file according to an exemplary embodiment of the present invention;

DETAILED DESCRIPTION OF THE INVENTION

Hereinafter, exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

The term "voice file" refers to a file that is made up of voice data and meta data, both of which are stored in a terminal. The voice data may include voice, song, etc., and the meta data may include a created data and order of the voice data, a type of the voice data, a name set when the voice file is stored, a meta image, and so on.

The term "meta image" refers to an image captured through a camera when a voice data is recorded in the terminal. The meta image may include information on the location of a bookmark set together therewith when being captured. The meta image may be stored in a region where the meta data such as the created date, the created order, etc., i.e. the detailed information of the voice file, is stored. At least one meta image may be stored in the voice file together with the voice data.

The term "bookmark function" refers to a function that enables a user to directly check the voice data starting from a location required by the user. To this end, the user registers as the bookmark a location where the user wants to hear the voice data again during storing or reproducing the voice data. Here, the location registered as the bookmark may be set at a point of time when the meta image is captured. The bookmark location is stored mapped with the meta image. Thus, when a plurality of meta images exists in one voice file, a plurality of locations, each of which is registered as the bookmark, may exist in the voice data. For example, when three meta images exist in one voice file, three bookmark locations mapped with the meta images may exist in the voice data.

The "terminal" may include a computer, a mobile phone, a digital camera, a voice recorder, a Moving Picture Experts Group-1 (MPEG-1) Audio Layer-3 (MP3) player, etc. all of which are data processing devices capable of creating a variety of data and storing the created data. Here, the term "terminal" refers to a device, such as a mobile phone, a voice recorder, an MP3 player, or the like, which can store the voice data input.

Figure 1:
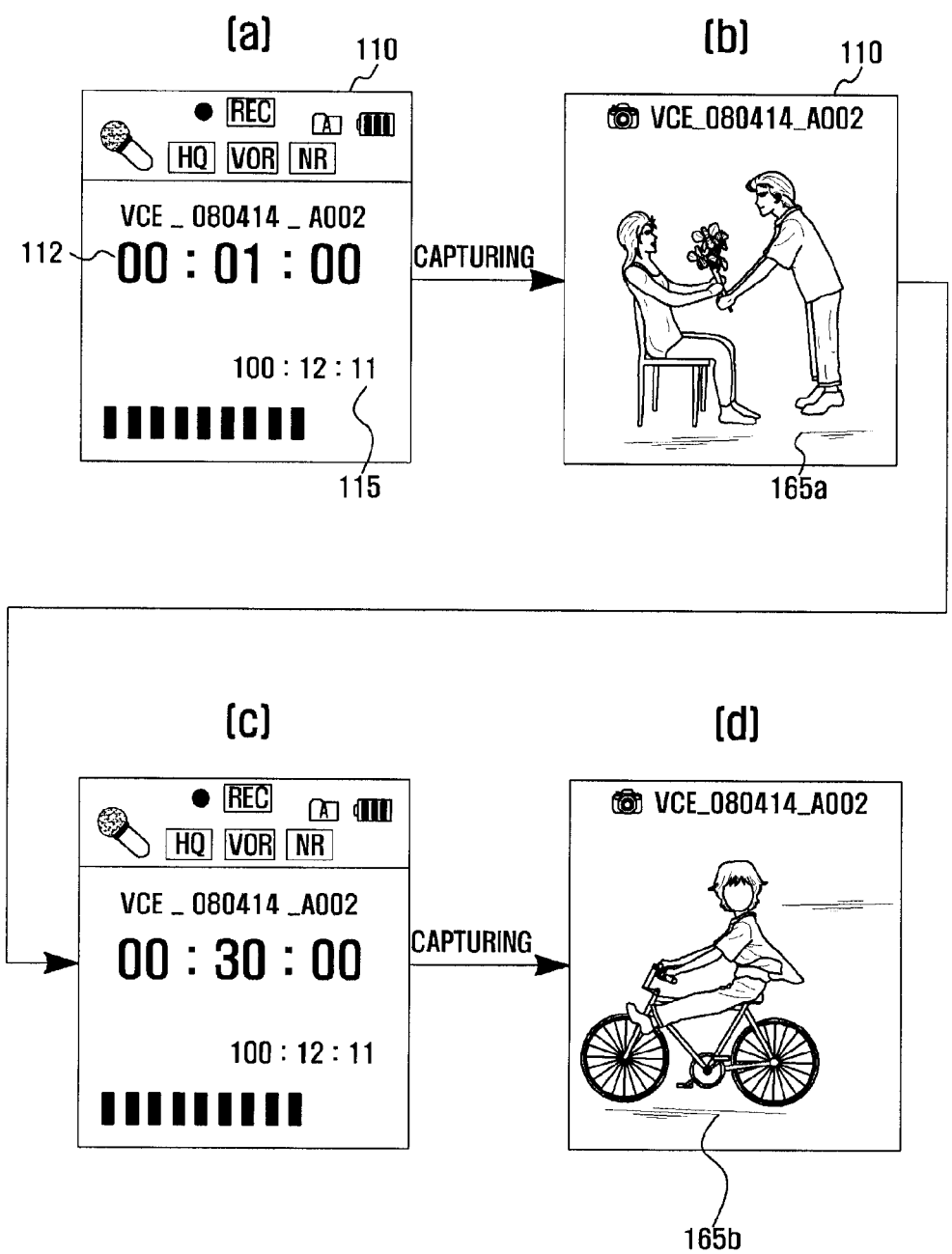
FIG. 1 illustrates a screen for capturing a meta image according to an exemplary embodiment of the present invention.

FIG. 1 illustrates a screen for capturing a meta image according to an exemplary embodiment of the present invention.

Referring to FIG. 1, when a recording mode is initiated by a terminal, a display unit 110 displays time 112 representing the volume of the voice data stored in a storage unit during the recording mode and a recordable time 115 depending on the storable capacity of a the storage unit, as illustrated in FIG. 1(a). Next, when capturing is selected during recording, the display unit 110 displays a meta image 165a captured by a camera, as illustrated in FIG. 1(b).

After displaying the meta image, the terminal determines whether the recording mode is terminated. If the recording mode is not terminated, the display unit 110 displays the time representing the volume of the voice data stored in a storage unit during the recording mode and the recordable time depending on storable capacity of the storage unit, as illustrated in FIG. 1(c). When the capturing is selected again, the display unit 110 displays a captured meta image 165b, as illustrated in FIG. 1(d). In other words, whenever the meta image 165 is captured during recording the voice data, the display unit 110 may display the captured meta image 165. Here the meta image can be a static image or a continuous image.

Figure 2:
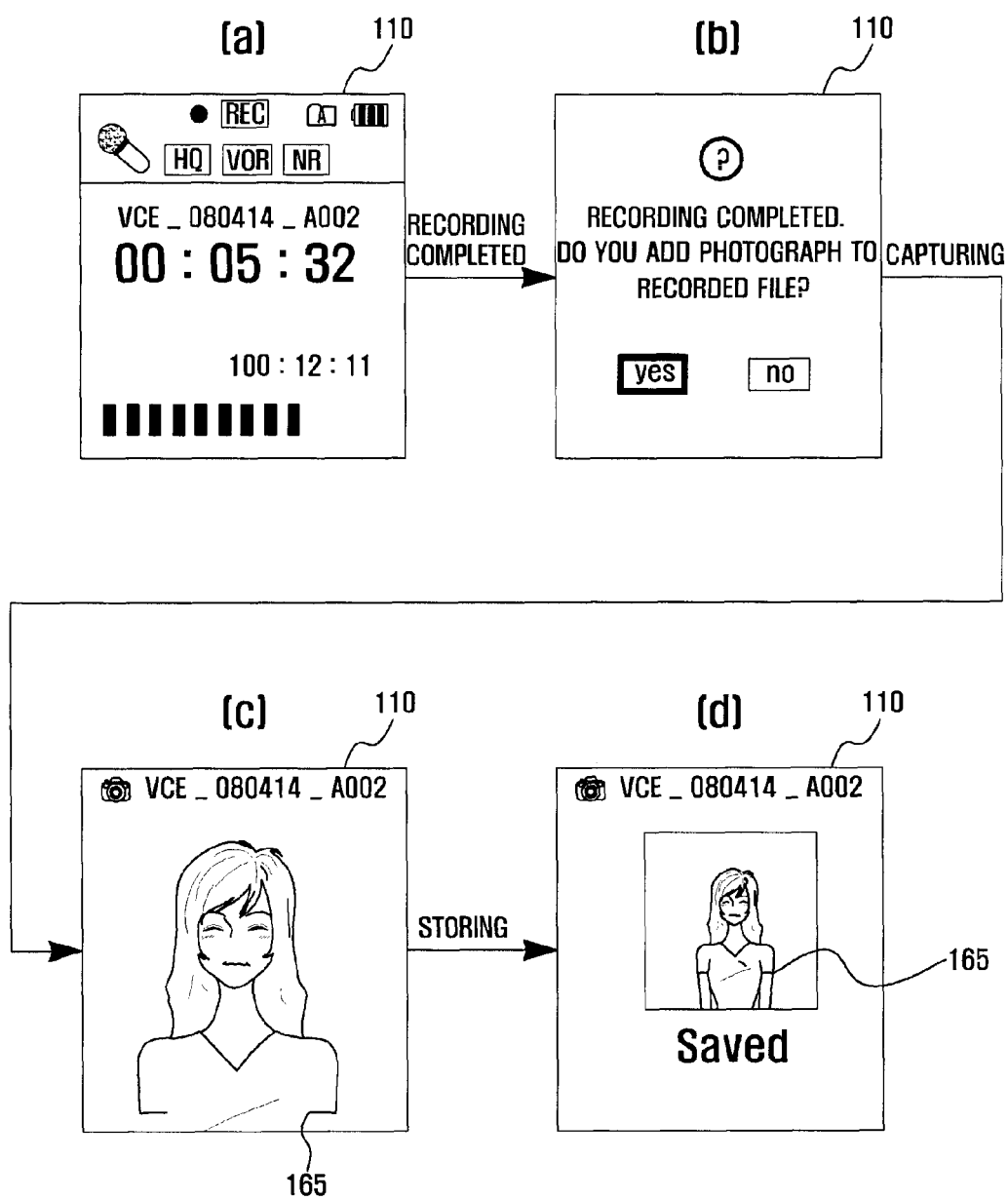
FIG. 2 illustrates a screen for capturing a meta image according to another exemplary embodiment of the present invention.

FIG. 2 illustrates a screen for capturing a meta image according to another exemplary embodiment of the present invention.

Referring to FIG. 2, a display unit 110 displays a screen, as illustrated in FIG. 2(a), at the initial recording mode. When the recording is completed, the display unit 110 displays an option window where it can be selected to add a photograph as a meta image in conjunction with the recorded voice data, as illustrated in FIG. 2(b). If the addition is selected, the display unit 110 displays the meta image 165 captured by a camera, as illustrated in FIG. 2(c). If a storing mode is selected, the display unit 110 indicates that the meta image 165 is stored, as illustrated in FIG. 2(d).

Next, a method of adding the meta image 165 to the stored voice file will be described with reference to FIG. 3.

Figure 3:
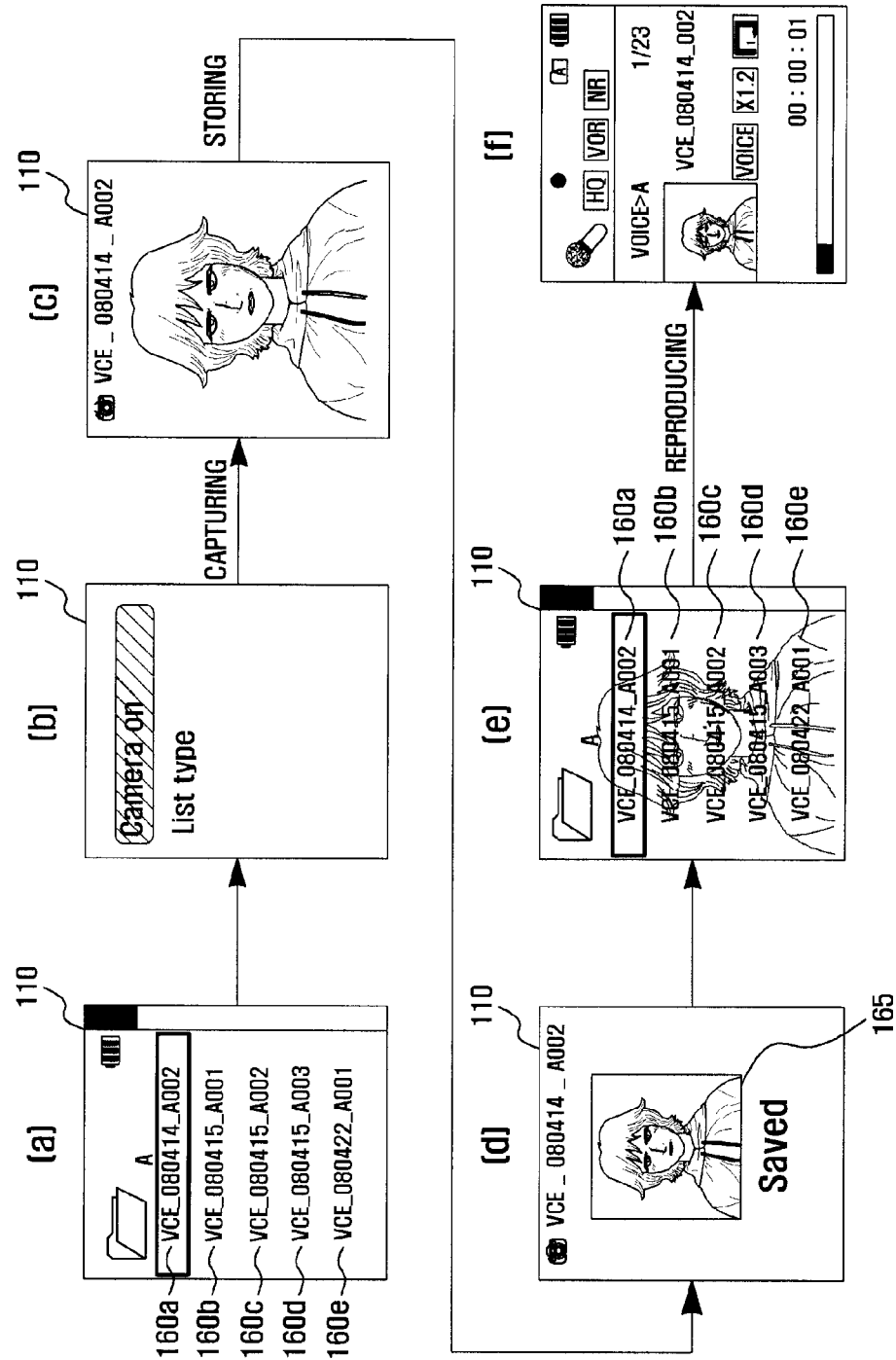
FIG. 3 illustrates a screen for adding a meta image according to an exemplary embodiment of the present invention.

FIG. 3 illustrates a screen for adding a meta image in details according to an exemplary embodiment of the present invention.

Referring to FIG. 3, when a file information is selected from, for instance, a menu by a user, a display unit 110 displays a list of the stored voice data in the storage unit, as illustrated in FIG. 3(a). The display unit 110 may display a name of the voice file selected by a user according to a highlighted or blocked type selection. Next, the display unit 110 displays a menu of selecting a camera function and a list-type menu of selecting a method of displaying the voice files, as illustrated in FIG. 3(b). When the camera function is selected to capture an image, the display unit 110 displays a captured meta image 165, as illustrated in FIG. 3(c). When a storage mode is selected, the display unit 110 displays that the meta image 165 that is stored, as illustrated in FIG. 3(d). Next, the display unit 110 displays the list of voice files again, as illustrated in FIG. 3(e). Here, the display unit 110 displays the captured meta image 165 to be overlapped with the voice file list. When a reproduction mode is selected, the display unit 110 displays a screen where the voice data corresponding to the selected voice file is reproduced, as illustrated in FIG. 3(f).

Figure 4:
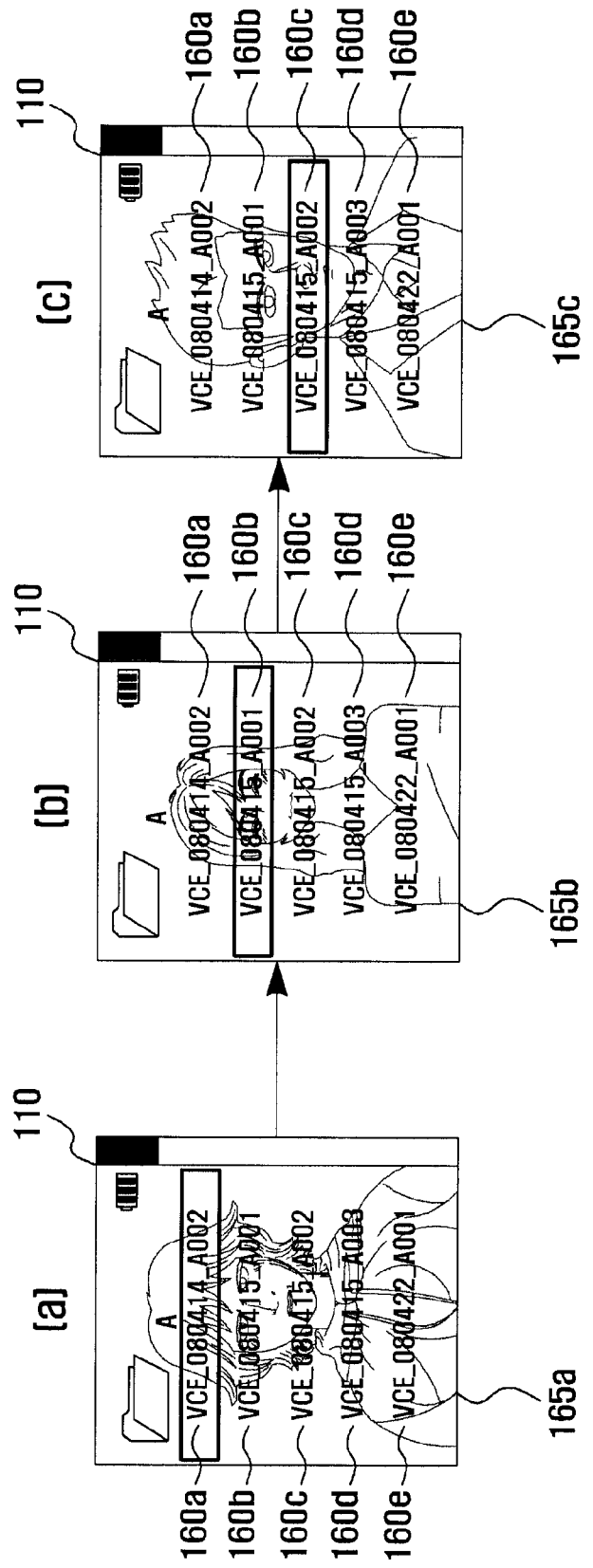

FIGS. 4 and 5 illustrate a screen displaying various meta images included in a voice file according to an exemplary embodiment of the present invention.

Referring to FIG. 4, a display unit 110 displays a list of stored voice files, as illustrated in FIG. 4(a). The display unit 110 displays one selected from the voice in a highlighted or blocked type. If one voice file, VCE_080414_A002, 160a is selected from the displayed voice files, the display unit 110 displays a meta image 165a corresponding to the voice file, VCE_080414_A002, 160a, as illustrated in FIG. 4(a). Next, when another voice file, VCE_080415_A001, 160b, is selected from the displayed voice files, the display unit 110 displays a changed meta image 165b corresponding to the voice file, VCE_080415_A001, 160b, as illustrated in FIG. 4(b). Similarly, when another voice file, VCE_080415_A002, 160c, is selected from the displayed voice files, the display unit 110 displays a changed meta image 165c corresponding to the voice file, VCE_080415_A002, 160c, as illustrated in FIG. 4(c).

Referring to FIG. 5, a display unit 110 may alternatively display a voice file 160 into a thumbnail through a meta image, as illustrated in FIG. 5(a). To be more specific, the display unit 110 may display one or more meta image 165a, 165b, 165c and 165d corresponding to the voice file 160a.

When a plurality of meta images 165 is included in one voice file, the display unit 110 may display the meta images 165 included in the voice file into one meta image 165a using a mosaic pattern, as illustrated in FIG. 5(b). Alternatively, the display unit 110 may display only one of the three meta images together with the number of stored meta images 165. Further, the display unit 110 may sequentially display the three meta images.

Figure 6:
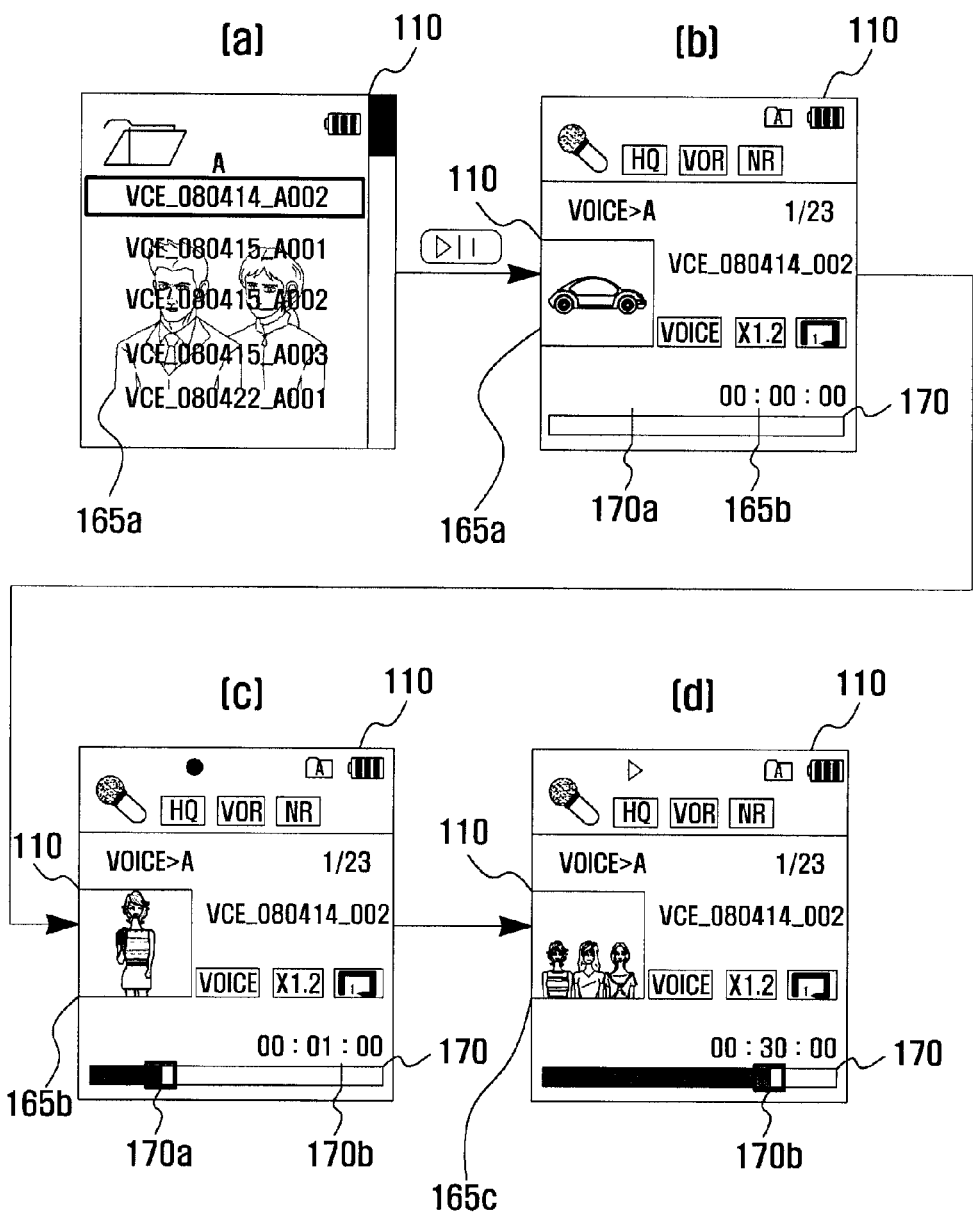
FIG. 6 illustrates a screen displaying a meta image during a reproducing mode according to an exemplary embodiment of the present invention.

FIG. 6 illustrates a screen displaying a meta image during a reproducing mode according to an exemplary embodiment of the present invention.

Referring to FIG. 6, a display unit 110 displays a list of reproducible voice files. When one of the voice files is selected, the display unit 110 displays a meta image 165a included in the selected voice file, as illustrated in FIG. 6(a). When a reproduction mode is selected, the display unit 110 displays a screen where voice data corresponding to the selected voice file is reproduced, as illustrated in FIG. 6(b). Here, the display unit 110 may display the meta image 165a on the screen at full size, or at a reduced size as illustrated in FIG. 6(b). The display unit 110 displays the time duration for which the voice data is reproduced in a bar pattern 170. Thus, a user can infer a total reproduction time, a remaining reproduction time, etc. of the voice data.

If a plurality of locations registered as a bookmark are set for the voice data that is being reproduced, the display unit 110 displays a mapped meta image 165 whenever the location registered as the bookmark is reproduced. For example, two locations registered as the bookmark may be set for the voice data that is being reproduced. In this case, as illustrated in FIG. 6(b), it is assumed that the two locations registered as the bookmarks are displayed on the bar pattern 170 representing the reproduction time of the voice data as 170a and 170b.

Then, when the voice data based on the first location 170a registered as the bookmark is reproduced, the display unit 110 displays a meta image 165b mapped to the first location 170a, as illustrated in FIG. 6(c). When the voice data based on the second location 170b registered as the bookmark is reproduced, the display unit 110 displays a meta image 165c mapped to the second location 170b, as illustrated in FIG. 6(d).

Figure 7:
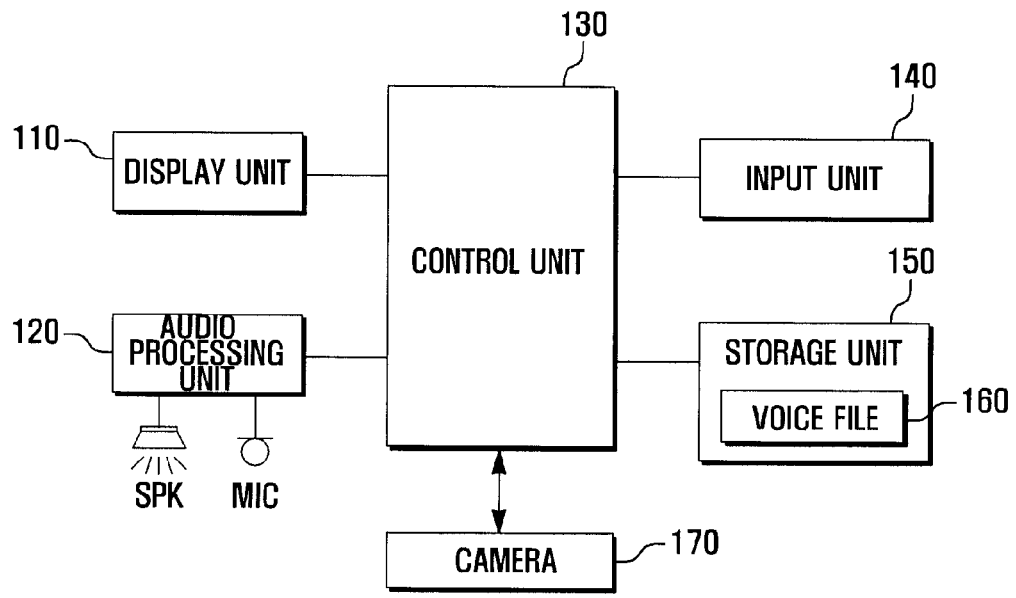
FIG. 7 schematically illustrates the configuration of a terminal according to an exemplary embodiment of the present invention.

Next, a configuration of the terminal that processes the meta image 165 included in the voice file will be described in detail with reference to FIG. 7. FIG. 7 schematically illustrates the configuration of a terminal according to an exemplary embodiment of the present invention.

Referring to FIG. 7, a terminal includes a display unit 110, an audio processing unit 120, a control unit 130, an input unit 140, a storage unit 150 storing a voice file 160, and a camera 170.

The display unit 110 may display various pieces of information and images associated with overall operation of the terminal. Particularly, as described in FIGS. 1 through 6, the display unit 110 may display the meta image 165 when the voice data is reproduced under the control of the control unit 130. When a recording function of storing the voice data is performed, the display unit 110 may display the meta image 165 captured through the camera 170 under the control of the control unit 130. Further, when a voice file display is selected, the display unit 110 displays either a list of the voice files 160 or the meta image 165 corresponding to one of the voice files 160 under the control of the control unit 130. Particularly, when a specific one of the listed voice files 160 is selected, the display unit 110 may display the meta image 165 corresponding to the selected voice file 160 under the control of the control unit 130.

The audio processing unit 120 includes a microphone and a speaker. The audio processing unit 120 modulates a voice signal input through the microphone into voice data, and sends the modulated voice data to the control unit 130. The audio processing unit 120 demodulates the voice data received from the control unit 130 to output it through the speaker.

The control unit 130 controls overall situations and operations of the terminal. Here, the control unit 130 stores the voice data input through the audio processing unit 120 in the storage unit 150 when a recording function of storing the voice data is selected. When a capturing function is selected via the input unit 140, the control unit 130 causes the camera 170 to capture a meta image 165. This captured meta image 165 is temporarily stored as a voice file 160 in the storage unit 150 together with the voice data.

When the voice data is stored, the control unit 130 may set a point of time when the meta image 165 is captured to a bookmark location. Here, the control unit 130 maps the set bookmark location with the meta image 165 captured at the bookmark location, and stores the mapped result as one voice file 160 in the storage unit 150.

When a voice file search is selected, the control unit 130 controls the display unit 110 to display the voice files 160 stored in the storage unit 150. The voice files 160 may be displayed in a list according to the selection of a user. Alternatively, the control unit 130 may display the voice files 160 on the display unit 110 in a thumbnail format using the meta images 165 included in the voice files 160. When one of the voice files 160 is selected via the input unit 140, the control unit 130 may display the meta image 165 corresponding to the selected voice file 160 on the display unit 110. In the case in which several meta images 165 are included in the selected voice file 160, the control unit 130 may display the meta images 165 in a created order.

The control unit 130 may replace the meta image 165 displayed on the display unit 110 with a new meta image 165. In detail, in the state where the meta image 165 is displayed on the display unit 110, the control unit 130 determines whether or not the capturing is selected. When the capturing is selected, the control unit 130 acquires a new meta image using the camera 170. Then, the control unit 130 replaces the meta image 165 included in the voice file 160 with the new meta image 165, and stores the replaced new meta image in the storage unit 150.

When a plurality of meta images 165 is included in the voice file 160, the control unit 130 may display the number of meta images 165 included in the voice file 160 on the display unit 110. Alternatively, the control unit 130 may display a portion or all the meta images 165 included in the voice file 160 on the display unit 110. Here, the control unit 130 may display the meta images as one meta image 165 having a mosaic pattern.

When the plurality of meta images 165 is included in the voice file 160, a plurality of bookmark locations may be set for the voice data corresponding to the voice file 160. When the voice file 160 having the plurality of meta images is selected, the control unit may display a list of the bookmark locations mapped with the plurality of meta images on the display unit 110.

Next, when a reproduction of the voice file 160 is selected, the control unit 130 may reproduce the voice data included in the selected voice file 160. At this time, the display unit 110 controls the audio processing unit 120 to output the reproduced voice data through the speaker. When one of the bookmark locations set for the voice data is selected, the control unit 130 may display the meta image 165 mapped with the selected bookmark location on the display unit 110. When the voice data set by the bookmark location is reproduced, the control unit 130 may display the mapped meta image 165 on the display unit 110.

The input unit 140 sends input signals associated with control of the functions of the terminal and their setup to the control unit 130. The input unit 140 may be implemented as a touch screen or a typical keypad. Further, the input unit 140 may be made up of functional keys, soft keys, etc. selected to perform the functions. Here, the input unit 140 may include directional keys capable of selecting the voice file 160, a recording key for storing the voice data, a capturing key for capturing the meta image 165, and so on.

The storage unit 150 may store application programs corresponding to the functions that can be performed by the terminal, data generated while the functions are performed by the terminal, and so on. Particularly, the storage unit 150 may store the voice file 160. Here, the architecture of the voice file 160 will be described with reference to FIG. 8.

Figure 8:
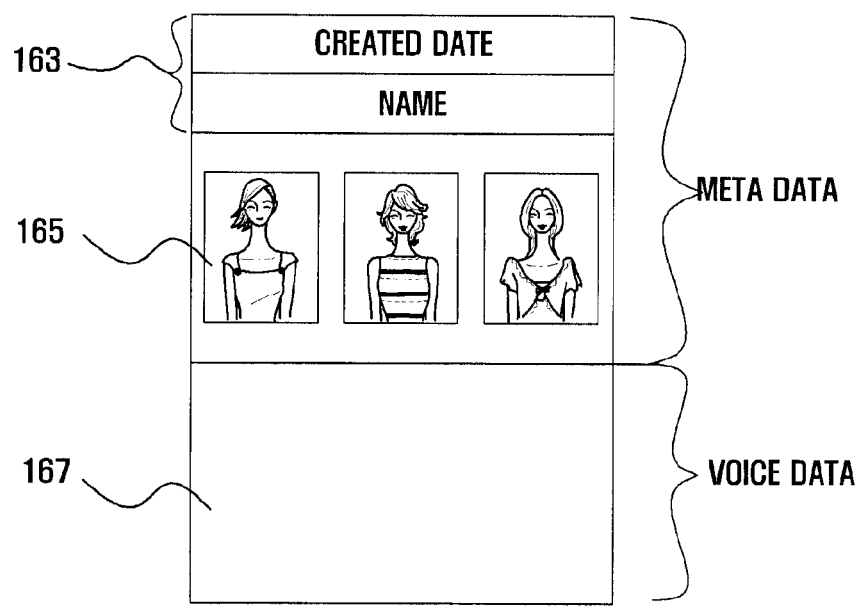
FIG. 8 illustrates the architecture of a voice file according to an exemplary embodiment of the present invention.

Referring to FIG. 8, a voice file 160 is made up of meta data and voice data 167. The meta data includes detailed information associated with the voice data 167. For example, the meta data may include a date which the voice data 167 is created, a name set when the voice data 167 is stored, and so one. Further, the meta data includes the meta image 165 captured through the camera 170 when the voice data 167 is stored or reproduced. Here, a plurality of meta images 165 may be included in the meta data. The meta images 165 are mapped with the respective bookmark locations where the bookmarks are set for the voice data 167.

The voice data 167 refers to data in which a signal corresponding to voice or song of a user is stored in the storage unit 150 through the recording function of the terminal. Here, the voice data 167 may include information on the bookmark locations set by the bookmarks.

Although not illustrated, the camera 170 includes a lens and an image sensor such as a charge coupled device (CCD) or a complementary metal oxide semiconductor (CMOS). Here, the camera 170 may capture the meta image 165 under the control of the control unit 130.

Next, a method of processing the meta image 165 will be described with reference to FIGS. 9 through 12.

Figure 9:
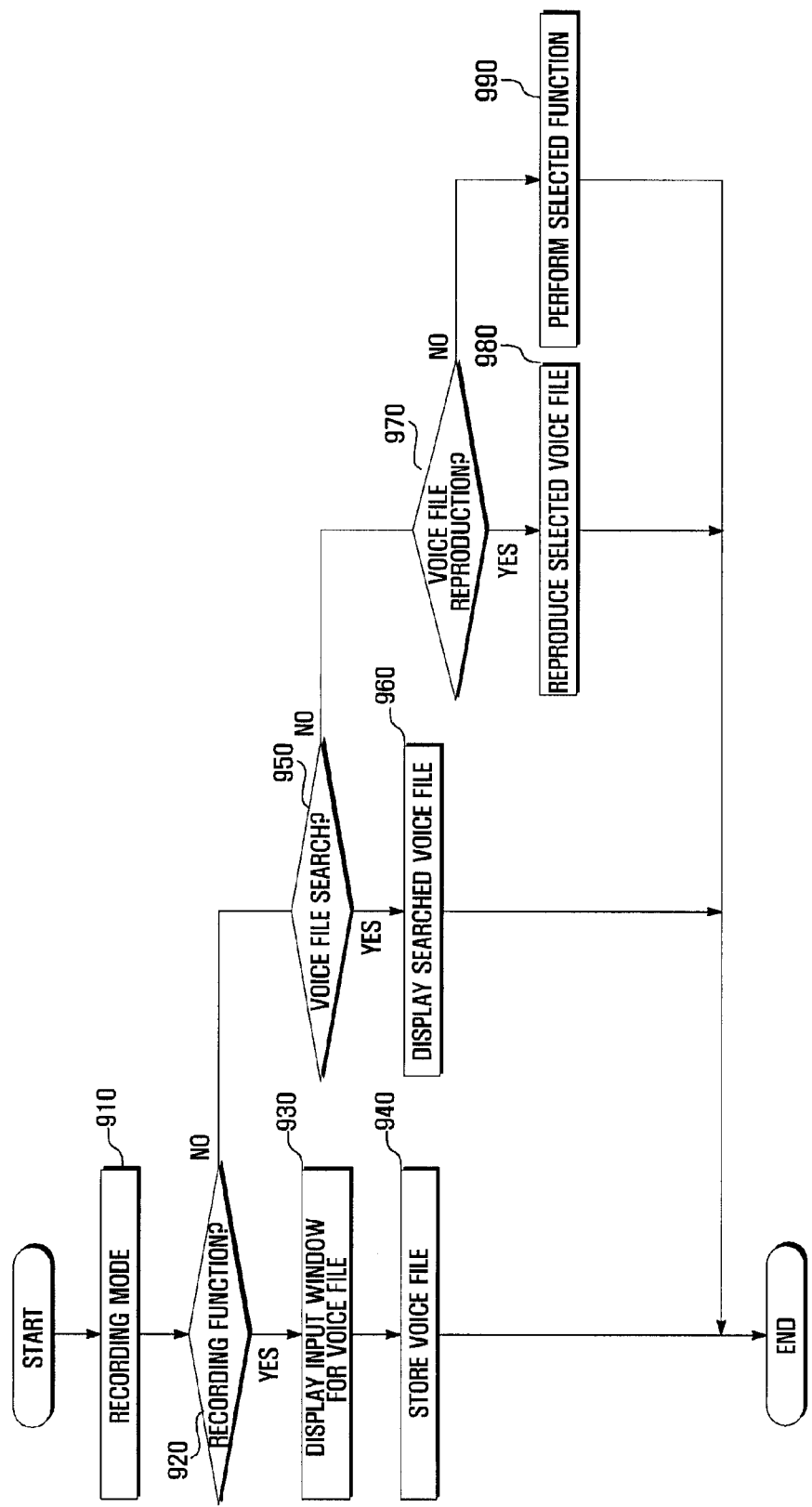
FIG. 9 is a flowchart illustrating a method of processing a voice file according to an exemplary embodiment of the present invention.

FIG. 9 is a flowchart illustrating a method of processing a voice file according to an exemplary embodiment of the present invention.

Referring to FIG. 9, when a user selects a recording mode using a menu or a functional key, the control unit 130 switches to the recording mode, which allows to create or check a voice file 160 in step 910. The control unit 130 determines whether or not the recording mode for creating the voice file 160 is selected through the input unit 140 in step 920.

If the recording function is selected, the control unit 130 displays an input window for the voice file 160 on the display unit 110 in step 930. The control unit 130 stores a voice data 167 input through the audio processing unit 120 in the storage unit 150 in step 940. Here, step 940 will be described later with reference to FIG. 10.

If the recording function is not selected in step 920, the control unit 130 determines whether or not search for the voice file 160 is selected in step 950. If yes, the control unit 130 may display a meta image corresponding to the searched voice file 160 in step 960. Here, step 960 will be described later with reference to FIG. 11.

In contrast, if the search for the voice file 160 is not selected, the control unit 130 determines whether or not a reproduction of the voice file 160 is selected in step 970. If yes, the control unit 130 reproduces the selected voice file 160 in step 980. Step 980 will be described later with reference to FIG. 12.

If the reproduction of the voice file 160 is not selected in step 970, the control unit 130 performs another selected function in step 990. Here, the selectable functions may include all other functions that can be performed by the terminal, such as a voice communication function, an Internet function, a diary function, and so on.

Next, the process of storing the voice file 160 will be described with reference to FIG. 10.

Figure 10:
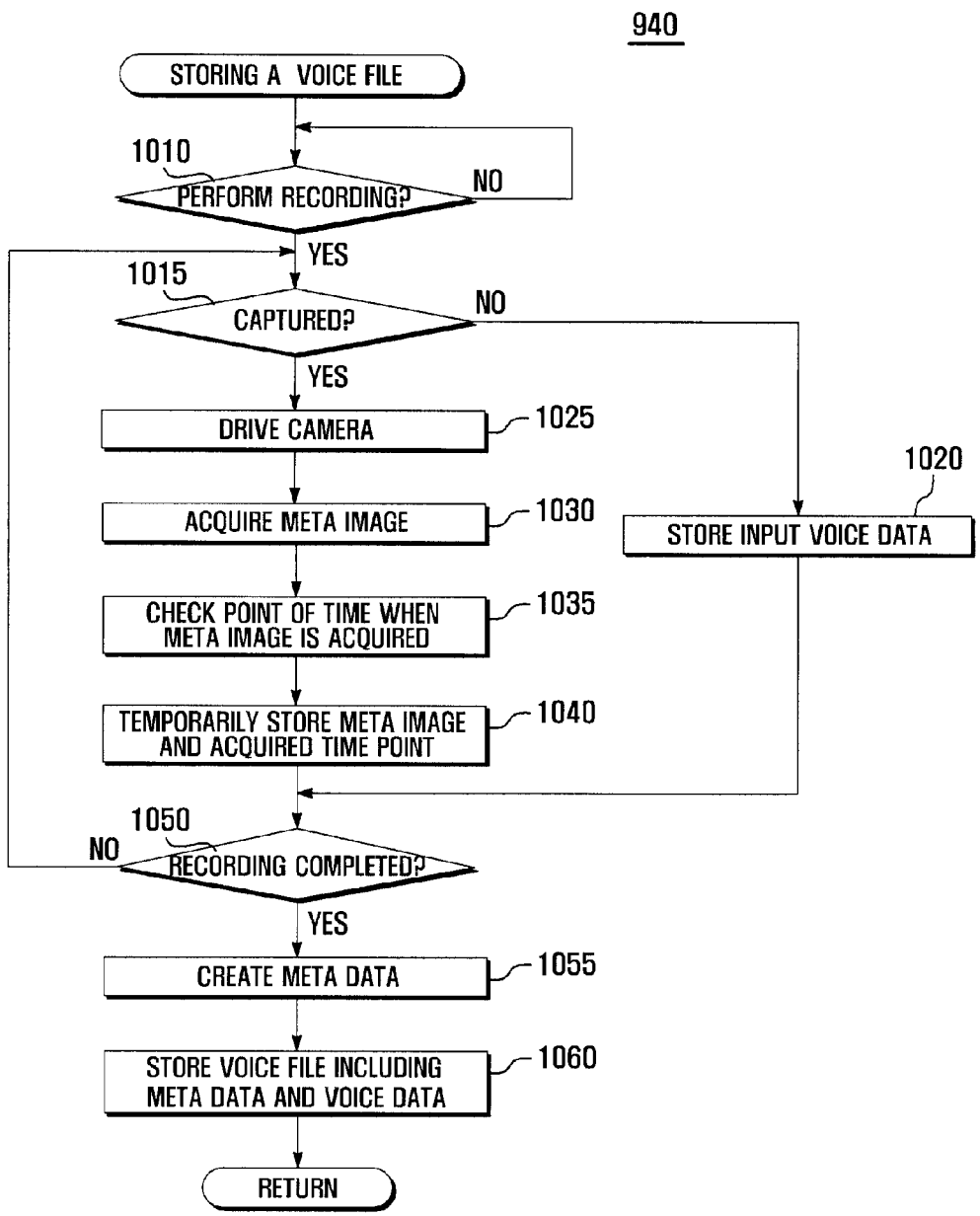
FIG. 10 is a flowchart illustrating a method of storing a voice file according to an exemplary embodiment of the present invention.

FIG. 10 is a flowchart illustrating a method of storing a voice file according to an exemplary embodiment of the present invention.

Referring to FIG. 10, the control unit 130 determines whether or not recording is selected through the input unit 140 in step 1010. When an input window for a voice file 160 is displayed and then the recording is selected, the control unit 130 stores a voice data 167 input through the audio processing unit 120 in the storage unit 150 in step 1015. The control unit 130 determines whether or not capturing is selected through the input unit 140.

If the capturing is not selected, the control unit 130 stores the voice data 167 input through the audio processing unit 120 in the storage unit 150 in step 1020. In contrast, if the capturing is selected, the control unit 130 drives the camera 170 in step 1025 to acquire a meta image 165 input through the camera 170 in step 1030. The control unit 130 checks a point of time when the meta image 165 is acquired, and the voice data 167 stored at the point of time when the meta image 165 is acquired in step 1035. Here, the voice data 167 stored at the point of time when the meta image 165 is acquired may be set to a bookmark location. Next, the control unit 130 temporarily stores information on the point of time when the meta image 165 is acquired and the acquired meta image 165 in step 1040.

The control unit 130 determines whether or not a recording is completed in step 1050. If not, the control unit 130 returns to step 1015, and thus may additionally capture another meta image 165. Whenever the meta image 165 is added, the control unit 130 may additionally set the bookmark location for the voice data 167 stored in the storage unit 150.

When the recording is completed, the control unit 130 creates meta data in step 1055. In detail, the control unit 130 creates the date which the voice data 167 is recorded, the name used when the voice data 167 is stored, the temporarily stored meta image 165, etc. as the meta data. The control unit 130 stores the voice file 160 including the created meta data and the voice data 167 in the storage unit 150. Here, the process of capturing the meta image 165 has been described as being performed while the voice file 160 is being stored, but it is not limited to this configuration. In other words, the process of capturing the meta image 165 may be performed in any process of performing the recording function according to a selection by a user. For example, the process of capturing the meta image 165 may be performed before the voice data 167 begins to be stored or after the recording is completed.

Figure 11:
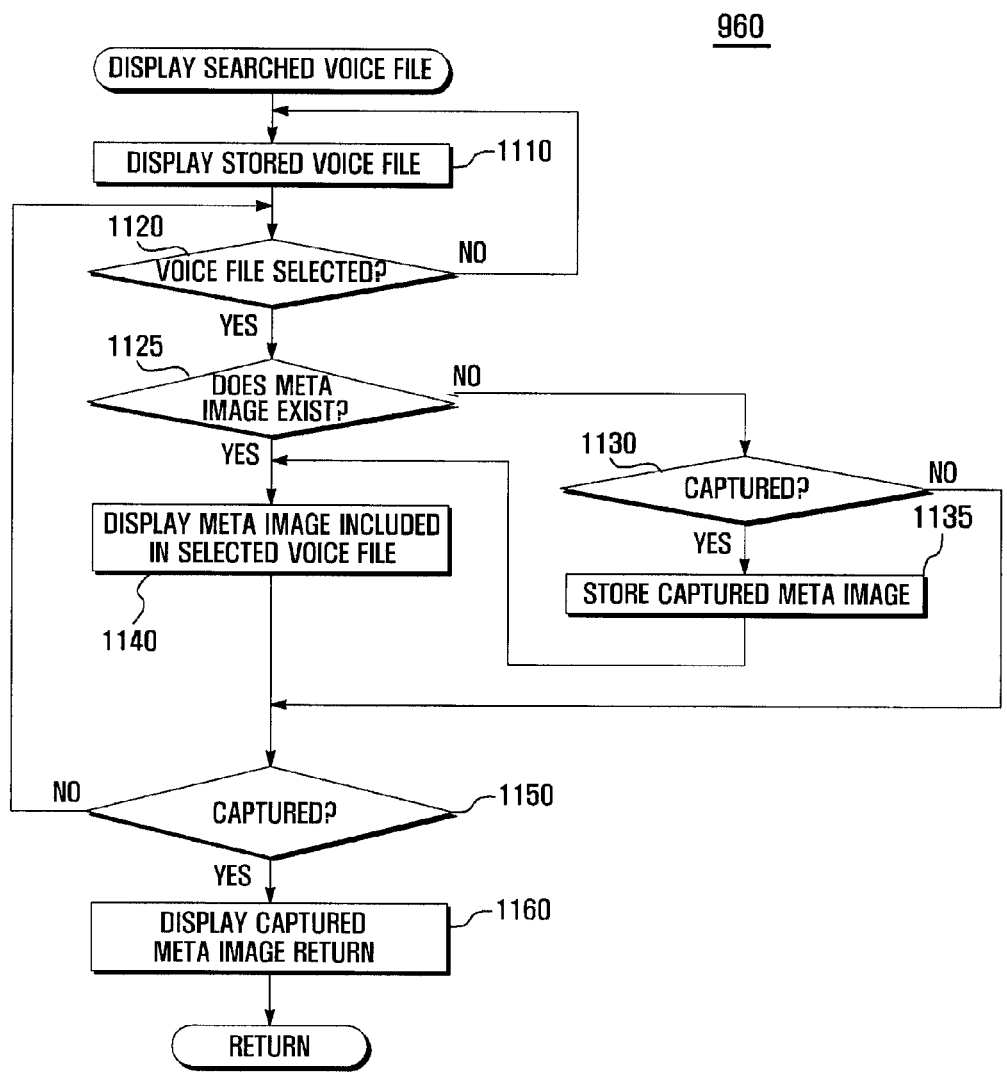
FIG. 11 is a flowchart illustrating a method of displaying a searched voice file according to an exemplary embodiment of the present invention.

Next, the process of displaying the searched voice file 160 in step 960 of FIG. 9 will be described with reference to FIG. 11. FIG. 11 is a flowchart illustrating a method of displaying a searched voice file according to an exemplary embodiment of the present invention.

Referring to FIG. 11, when a search for the voice file 160 is selected, the control unit 130 displays at least one voice file 160 stored in the storage unit 150 on the display unit 110 in step 1110. The control unit 130 may display a list of the voice files 160 according to the selection of a user. Further, the control unit 130 may display at least one metal image 165 included in the voice file 160 on the display unit 110 according to the selection of a user. Here, it is assumed that the voice files 160 are arranged in a list.

Next, the control unit 130 determines whether or not one selected from the displayed voice files 160 exists in step 1120. If the voice file 160 selected through the input unit 140 exists, the control unit 130 determines whether or not a meta image 165 exists in the selected voice file 160 in step 1125.

If the meta image 165 does not exist, the control unit 130 determines whether or not capturing is selected through the menu or the input unit 140 in step 1130. If the capturing is selected, the control unit 130 acquires another meta image 165 through the camera 170 in step 1135. Next, the control unit 130 adds the acquired meta image 165 to the voice file 160, and stores the added result. The control unit 130 displays the meta image 165 included in the selected voice file 160 on the display unit 110 in step 1140.

In contrast, if the meta image 165 exists in the selected voice file 160 in step 1125, the control unit 130 displays the meta image 165 included in the selected voice file 160 on the display unit 110 in step 1140.

When the meta image 165 is displayed, the control unit 130 determines whether or not capturing is selected through a menu or a functional key in step 1150. If the capturing is selected, the control unit 130 drives the camera 170 to capture a meta image 165 in step 1160. The control unit 130 displays the newly captured meta image 165 on the display unit 110 instead of the displayed meta image 165. At this time, the control unit 130 deletes the meta image 165 stored in the voice file 160, and stores the newly captured meta image 165 in the voice file 160.

Figure 12A:
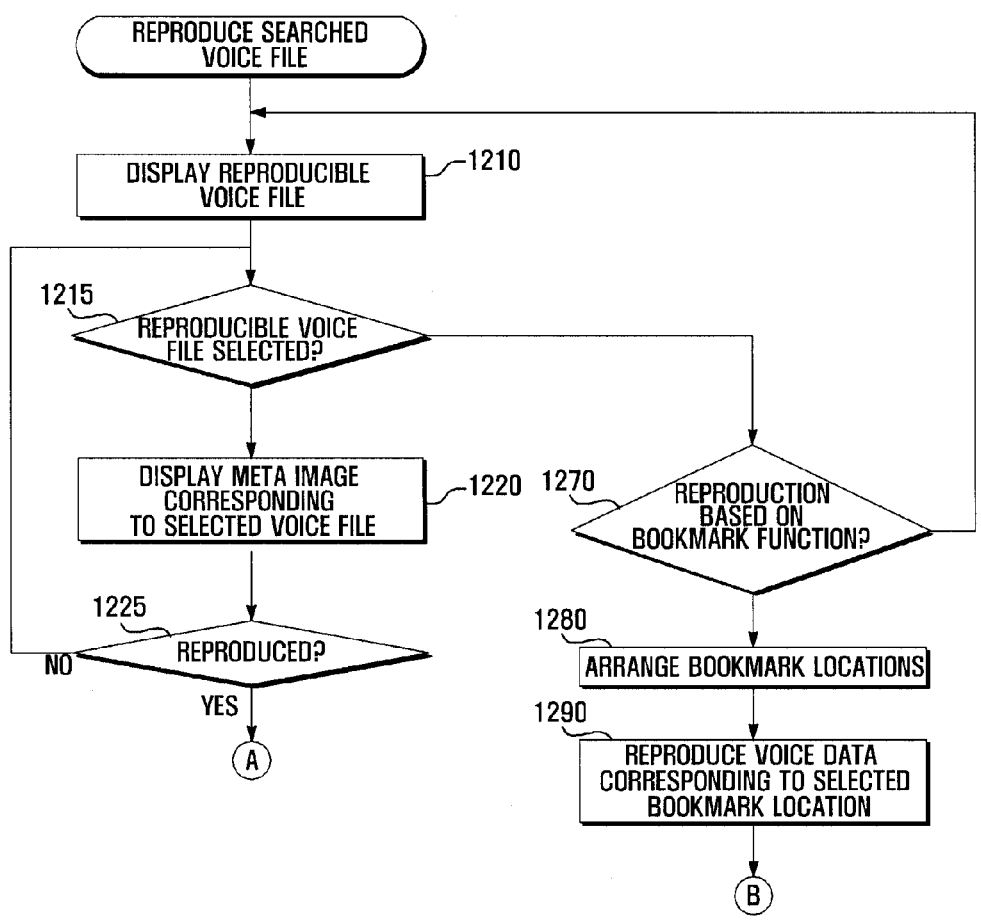
FIGS. 12a and 12b are flowcharts illustrating a method of reproducing a voice file according to an exemplary embodiment of the present invention.
Figure 12B:
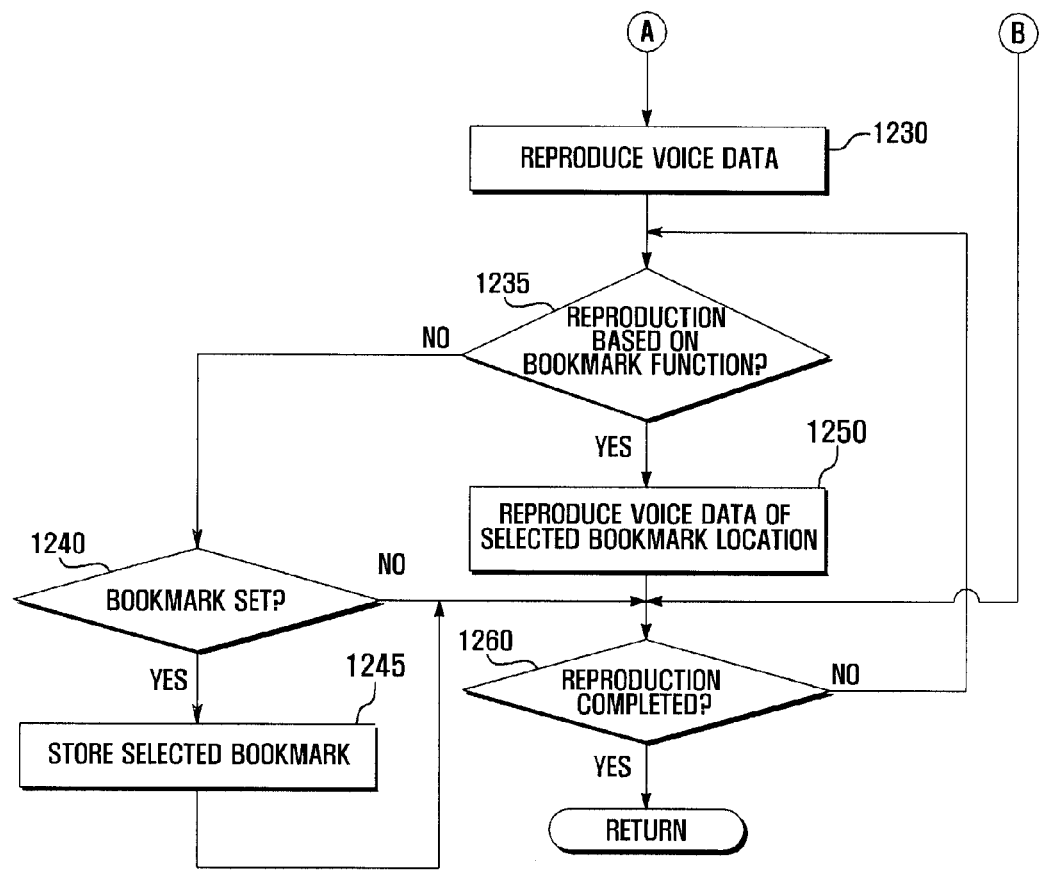

Now, the process of reproducing the selected voice file 160 in step 970 of FIG. 9 will be described in detail with reference to FIGS. 12a and 12b. FIGS. 12a and 12b are flowcharts illustrating a method of reproducing a voice file according to an exemplary embodiment of the present invention.

Referring to FIGS. 12a and 12b, the control unit 130 displays reproducible voice files 160 on the display unit 110 in step 1210. Here, the voice files 160 may be displayed in a list as described in step 1110 of FIG. 11, and meta images 165 corresponding to the voice files 160 may be displayed. The control unit 130 determines whether or not one of the reproducible voice files 160 is selected in step 1230.

If the voice file 160 is selected, the control unit 130 displays at least one meta image 615 corresponding to the selected voice file 160 in step 1220. Then, the control unit 130 determines whether or not reproduction is selected in step 1225. If the reproduction is selected through a menu or a functional key, the control unit 130 reproduces voice data 167 corresponding to the selected voice file 160 in step 1230. The control unit 130 outputs the reproduced voice data 167 through the audio processing unit 120.

Then, the control unit 130 determines whether or not the reproduction is selected through a bookmark function during the reproducing of the voice data 167 in step 1235. If the reproduction is not selected through the bookmark function, the control unit 130 determines whether or not bookmark setup is selected in step 1240. If the bookmark function is selected, the control unit 130 stores a location selected from the voice data 167 by a user as a bookmark location in step 1245. For example, in the case where the bookmark function is selected through the capturing of the camera 170, the control unit 130 may map the bookmark location to the captured meta image 165 and store the mapped result in the storage unit 150. At this time, the control unit 130 adds the captured meta image 165 and the bookmark location to the voice file 160 including the voice data that is being produced at present, and stores the added result.

In contrast, if the reproduction is selected through the bookmark function in step 1235, the control unit 130 reproduces voice data 167 corresponding to the selected bookmark location in step 1250. For example, when the voice data 167 is reproduced by a terminal such as a voice recorder, and when a step forward key provided to the input unit 140 is input, the control unit 130 may reproduce the voice data 167 corresponding to a location where the bookmark is set. Alternatively, when the bookmark location is selected through a menu, the control unit 130 may reproduce the voice data 167 corresponding to the selected bookmark location. Next, the control unit 130 determines whether or not the reproduction of the voice data 167 is completed in step 1260. If the reproduction of the voice data 167 is not completed, the control unit 130 returns to step 1235 to thereby be able to set the bookmark location or reproduce the voice data 167 corresponding the set bookmark location.

If one of the reproducible voice files 160 is not selected in step 1215, the control unit 130 determines whether the reproduction is selected through the bookmark function in step 1270. If the bookmark function is selected through a menu or a functional key, the control unit 130 arranges the bookmark locations set for each voice file 160 stored in the storage unit 150 in a list in step 1280. The control unit 130 reproduces the voice data 167 corresponding to the selected bookmark location, and outputs the reproduced voice data 167 through the audio processing unit 120 in step 1290. In this case, the control unit 130 may also display the meta image 165 mapped to the bookmark location on the display unit 110.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A sound recording terminal comprising:
   an audio processing unit receiving input sound data;
   a camera capturing a meta image when the sound data is input;
   a storage unit storing at least one sound file including the sound data and the captured meta image;
   a control unit acquiring the meta image via the camera and recording the sound data input via the audio processing unit during a recording mode, creating at least one sound file based on the sound data and the at least one meta image, storing the at least one sound file in the storage unit; and
   a display unit displaying, in a sound file search mode, a list of sound files represented as lines of alphanumeric text, the list of sound files being displayed as part of a foreground display;
   wherein the control unit is further configured to detect a selection for distinctively displaying a first sound file of the list, and the display unit displays a first captured meta image corresponding to the selected first sound file as a background image superimposed with the alphanumeric text of the list, and when a second sound file of the list is selected for distinctive display, the superimposed background image is changed to a second captured meta image corresponding to the second sound file before determining whether or not reproduction of the second sound file is selected, while the same foreground display of the list of sound files is maintained.

2. The sound recording terminal of claim 1, wherein the control unit sets a bookmark location for the sound data stored at a point of time when the meta image is acquired, maps the meta image to the bookmark location, and stores the mapped result in the storage unit.

3. The sound recording terminal of claim 2, wherein, when the sound file includes at least one meta image, the controller controls the display unit to display the voice file together with a number of the meta images included in the sound file.

4. The sound recording terminal of claim 3, wherein, when one of the displayed bookmark locations is selected, the controller reproduces the sound data corresponding to the selected bookmark location.

5. The sound recording terminal of claim 4, wherein the controller controls the display unit when the sound data is reproduced, and displays the meta image mapped to the bookmark location.

6. The sound recording terminal of claim 1, wherein, when the sound file is selected, the controller displays at least one bookmark location mapped with the meta image included in the sound file in the list.

7. An image processing method of a voice recordable terminal having a camera, comprising:
   determining whether or not an image capturing mode is selected during a sound recording mode to create sound data;

acquiring at least one meta image captured by the camera when the image capturing mode is selected;

creating at least one sound file based on the sound data and the at least one meta image;

storing the at least one sound file;

displaying, in a sound file search mode, a list of sound files represented as lines of alphanumeric text, the list of sound files being displayed as part of a foreground display;

detecting a selection for distinctively displaying a first sound file of the list;

displaying, when the first sound file of the list is selected, a first captured meta image corresponding to the selected first sound file as a background image superimposed with the alphanumeric text of the list; and changing, when a second sound file of the list is selected for distinctive display, the superimposed background image to a second captured meta image corresponding to the second sound file before determining whether or not reproduction of the second sound file is selected, while maintaining the same foreground display of the list of sound files.

8. The image processing method of claim 7, wherein acquiring at least one meta image comprising:

setting a bookmark location for the sound data stored at a point of time when the meta image is acquired; and mapping the meta image to the set bookmark location and storing the mapped result.

9. The image processing method of claim 7, wherein displaying the meta image comprising:

determining whether the meta image is included in the selected sound file; and displaying the meta image when the meta image is included in the sound file.

10. The image processing method of claim 9, further comprising:

determining whether or not the image capturing is selected when the meta image included in the voice file does not exist; and acquiring and displaying a meta image when the image capturing is selected.

11. The image processing method of claim 7, further comprising displaying at least one bookmark location mapped with at least one meta image associated with the selected sound file.

12. The image processing method of claim 7, further comprising, when one of the displayed bookmark locations is selected, reproducing the sound data corresponding to the selected bookmark location.

13. The image processing method of claim 12, further comprising, during reproducing the sound data, displaying the meta image mapped to the bookmark location.

14. An image processing method of a voice recordable terminal having a camera, comprising:

determining whether or not an image capturing mode is selected during a sound recording mode to create sound data;

acquiring a plurality of first meta images captured by the camera when the image capturing mode is selected, each of the first meta images being mapped to a respective reproduction time point of a first sound file;

creating the first sound file based on the sound data and the plurality of first meta images;

storing the first sound file;

displaying, in a sound file search mode, a list of sound files represented as lines of alphanumeric text, the list of sound files being displayed as part of a foreground display;

detecting a selection for distinctively displaying a sound file of the list;

displaying, when the first sound file of the list is selected, one of the first meta images corresponding to the selected first sound file as a background image superimposed with the alphanumeric text of the list;

changing, when a second sound file of the list is selected for distinctive display, the superimposed background image to a second captured meta image corresponding to the second sound file, while maintaining the same foreground display of the list of sound files; and in response to detecting a selection for a reproduction mode when the first sound file is distinctively displayed, displaying a reproduction screen including a bar pattern containing at least one bookmark corresponding to a bookmarked image of the plurality of first meta images, the bookmarked image differing from the one of the first meta images displayed as the background image superimposed with the alphanumeric text of the list, and displaying the bookmarked image when voice data based on the bookmarked image is reproduced.

15. The image processing method of claim 14, wherein the bookmarked image is displayed as a thumbnail image.

* * * * *